Dec. 30, 1924.                                                            1,521,112
J. D. LAWRENCE
WINDOW CONTROLLING DEVICE
Filed Nov. 20, 1920
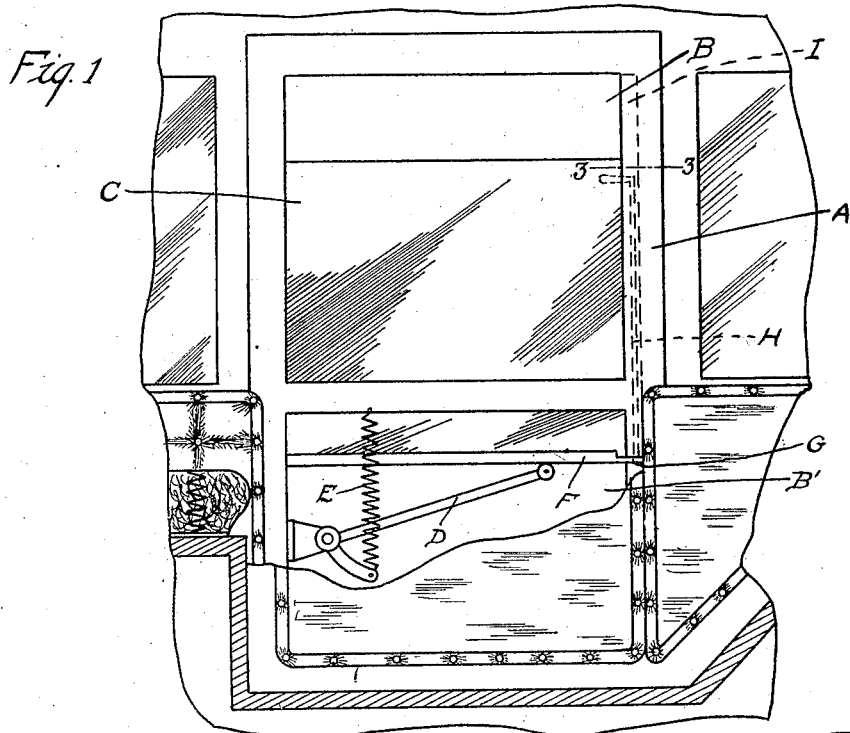
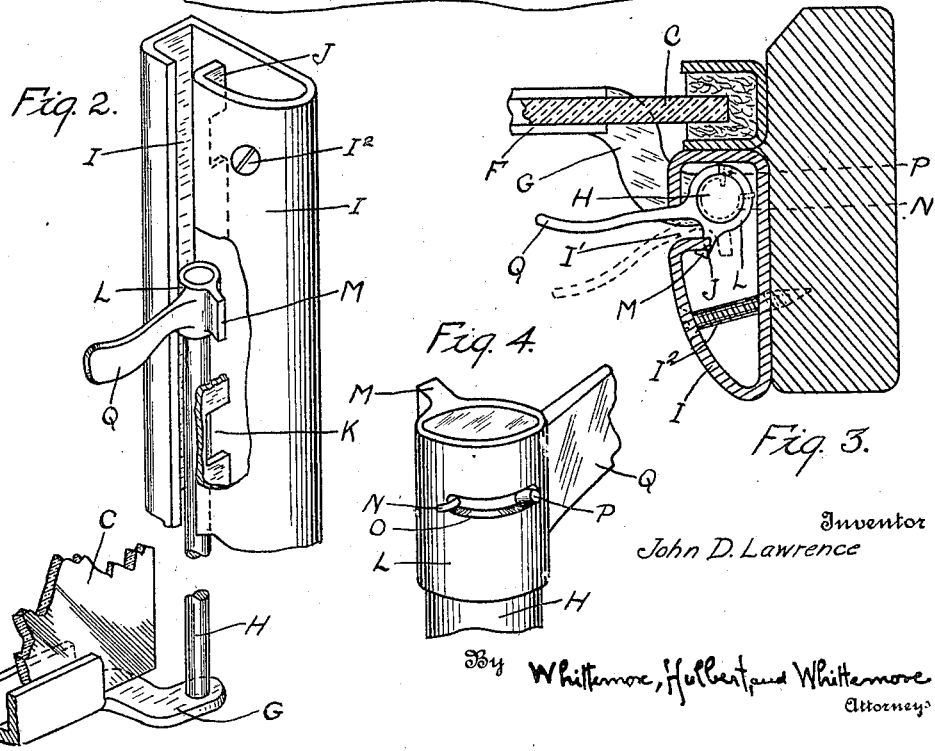
Inventor
John D. Lawrence
By Whittemore, Hulbert and Whittemore
Attorneys Patented Dec. 30, 1924.

1,521,112

UNITED STATES PATENT OFFICE.

JOHN D. LAWRENCE, OF TOLEDO, OHIO, ASSIGNOR TO THE DURA COMPANY, OF TOLEDO, OHIO, A CORPORATION OF DELAWARE.

WINDOW-CONTROLLING DEVICE.

Application filed November 20, 1920. Serial No. 425,312.

*To all whom it may concern:*

Be it known that I, JOHN D. LAWRENCE, a citizen of the United States of America, residing at % Dura Mechanical Hardware Co., in the city of Toledo and State of Ohio, have invented certain new and useful Improvements in Window-Controlling Devices, of which the following is a specification, reference being had therein to the accompanying drawings.

This invention relates to window controlling devices and more particularly to devices for controlling the raising, lowering and locking of sliding windows in motor vehicles.

The invention consists in the structural features and arrangement of parts hereinafter fully set forth.

In the drawings:—

Figure 1 is an interior view of a motor vehicle door provided with a window equipped with a controlling device in accordance with the invention.

Figure 2 is a perspective view of the stem through which the window member is actuable vertically, showing the means associated with said stem for locking the window in various positions of vertical adjustment.

Figure 3 is a cross section taken on lines 3—3 of Figure 1 and illustrating the control means.

Figure 4 is a fragmentary perspective view of the actuating handle and locking head which is carried by said stem.

In these views the reference character A designates a motor vehicle door having in its upper portion a window opening B and having its lower portion chambered as indicated at B'. The closure for the opening B is formed by a vertically slidable plate of glass C which in lowered position is adapted to enter the chamber B'. As is customary, there is provided suitable means counter-balancing the weight of the glass plate C, this means consisting preferably of a pivotal arm D bearing upwardly at its free end upon the lower edge of said plate and urged upwardly by a coiled spring E, tensioned to exert the proper counter-balancing effort. The bottom edge of the glass plate C is permanently engaged by a strip F, the sides of which are cut away at one end of said strip to form the terminal tongue G to which is secured the lower extremity of a vertical actuating stem H. Said stem extends freely upwardly within a tubular member I, preferably formed of sheet metal and longitudinally slotted as indicated at I'. Said member is secured to the door A at one side of the window opening B by screws $I^2$, and is shaped to serve as a trim stick for the window. One margin of the slot I' is flanged inwardly as indicated at J and said flange is formed with a series of notches K. Upon the upper end of the stem H there is mounted a combined handle and locking member comprising a sleeve L rotatable upon said stem and formed with the radially projecting lug M adapted for locking engagement with any one of the notches K, when said sleeve is in the rotative position shown in full lines in Figure 3. A coiled spring N embraces the stem H within said sleeve urging the same into normal engagement with one of the notches K, said spring having one extremity anchored in the stem H and having its other end bearing against one end of a circumferentially extended slot O in said sleeve (see Figs. 3 and 4). Said sleeve is restrained from vertical movement upon the stem H by a pin P projecting from the stem into the slot O. Q designates a handle member integral with the sleeve L and projecting radially therefrom through the slot I'.

Considering now the operation of the described invention, when it is desired to vary the position of adjustment of the window member C the handle Q is rocked from the position shown in full lines in Fig. 3 to the dash line position illustrated in the same figure. The sleeve L is thus rocked upon the stem H through a sufficient angle to disengage the lug M from the notched flange J, said lug assuming the dash line position shown in Fig. 3. By exerting pressure upwardly or downwardly upon the handle Q, the stem H and window member C may now be adjusted upwardly or downwardly to any desired position. When the handle member Q is released the spring N rocks the sleeve L to its normal position engaging the lug M with one of the notches K and thereby maintaining the desired adjustment of the window member.

It is a feature of the described invention that the tubular member I not only provides a casing or housing for the stem H and a locking element co-acting with the head of said stem to hold the latter and window member properly adjusted, but further functions as a trim stick or finishing piece for the window. By forming the locking notches in the flange J disposed interiorly of the tubular member I, said flange and notches are concealed and do not detract from the pleasing appearance of the trim stick.

The inwardly projecting flange J, in addition to forming a latch element, further functions as a guide for the stem H restraining said stem against lateral swinging about its supported lower end.

What I claim as my invention is;

1. In a window control mechanism, the combination with a slidable window member, of a stem secured to said member, a locking head carried by said stem and adapted to rock thereon, a co-acting tubular locking member enclosing said stem and longitudinally slotted, and inwardly flanged marginal to said slot and formed upon said flange with a series of notches engageable by said locking head in one position of its rocking movement, said head including a handle member projecting through the longitudinal slot in the tubular member.

2. In a window controlled mechanism, the combination with a slidable window member of a stem secured to said member, a longitudinally slotted tubular member enclosing said stem and interiorly formed with a vertical series of locking notches and a locking head rotative upon said stem, longitudinally fixed thereon, said head having a projection within said tubular member normally engaging one of said locking notches and having a handle projecting through the longitudinal slot of said tubular member.

3. In a window control mechanism, comprising a slidable window member, a stem carried by said member, a longitudinally slotted tubular member enclosing said stem and flanged inwardly marginal to the longitudinal slot and formed with a series of notches in said flange, a locking head rotative upon the upper end of said stem and restrained from longitudinal movement thereupon, comprising a lug within said tubular member engageable with one of said notches and a handle projecting outwardly through said slot of the tubular member, and a spring urging said locking head rotatively to normally engage said lug in one of said notches.

4. In a window control mechanism, the combination with a slidable window member, of a stem secured to said member and forming a control means therefor, a longitudinally slotted tubular member through which said stem extends, said member being formed with an inwardly projecting flange marginal to said slot and said flange being formed with a series of notches and a latch element carried by said stem selectively engageable with said notches to hold the window member adjusted in various positions.

5. In a window control mechanism, the combination with a slidable window member, of a stem secured to said member forming a control means therefor, a longitudinally slotted tubular member through which said stem is extended, said member being formed with an inwardly projecting flange marginal to said slot and said flange being formed with a series of notches and the latch element carried by said stem selectively engageable with said notches to hold the window member variously adjusted and formed with a handle portion projecting from said tubular member through the longitudinal slot thereof.

6. In a window control device, the combination with a slidable window member, of a control stem secured to said member, a latch element carried by said stem, a tubular member through which said stem is extended having an inturned latch portion co-acting with said element on the stem, said tubular member having a part forming a trim stick and said latch portion of the tubular member functioning further as a guide for said stem.

7. In a window control mechanism, the combination with a slidable window member, of a stem secured to said member, a longitudinally slotted tubular member inclosing said stem, and a locking head rotative upon said stem and longitudinally fixed thereon, said head having a projection normally having locking engagement with said tubular member interiorly of the latter, and having a handle projecting through the longitudinal slot of said tubular member.

8. In a window control mechanism, the combination with a slidable window member, of a stem secured to said member, a longitudinally slotted tubular member inclosing said stem and provided with a concealed longitudinally extending latch portion, a locking member upon said stem having a portion within said tubular member for engaging the latch portion of said tubular member and also having an actuating portion projecting through the longitudinal slot of said tubular member.

9. In a window control mechanism, the combination with a slidable window member, of a stem secured to said member, a longitudinally slotted tubular member inclosing said stem and provided with a concealed longitudinally extending latch portion, a locking member upon said stem having a portion within said tubular member for engaging the latch portion of said tubular member, and yieldable means for normally holding the first-mentioned portion of said locking member in engagement with the latch portion of said tubular member.

10. In a window control mechanism, a member having a window opening, a slidable closure for said opening, a chamber receiving said closure in an open position thereof, a control stem secured to said closure near its lower extremity, a tubular member secured to said first-mentioned member adjacent an edge of said window opening and extending in the direction of movement of said closure, said tubular member inclosing said control stem and having a longitudinal slot and a concealed latch portion, a locking member upon said stem having a latch element for engaging the latch portion of said tubular member and an actuating portion extending through the longitudinal slot of said tubular member, said stem being extended to locate the actuating portion of said locking member in said window opening in all positions of said closure.

In testimony whereof I affix my signature.

JOHN D. LAWRENCE.